United States Patent [19]

Lundquist

[11] Patent Number: 5,414,062
[45] Date of Patent: May 9, 1995

[54] METHOD FOR REDUCTION OF AQUEOUS PHASE POLYMER FORMATION IN SUSPENSION POLYMERIZATION

[75] Inventor: Eric G. Lundquist, North Wales, Pa.

[73] Assignee: Rohm and Haas Company, Philadelphia, Pa.

[21] Appl. No.: 209,653

[22] Filed: Mar. 10, 1994

[51] Int. Cl.$^6$ ................................. C08F 2/18
[52] U.S. Cl. ........................ 526/74; 526/195; 526/229; 526/336
[58] Field of Search .................. 526/74, 195, 229

[56] References Cited

U.S. PATENT DOCUMENTS

| | | | |
|---|---|---|---|
| 3,995,096 | 11/1976 | Flatau et al. | 526/74 |
| 4,438,242 | 3/1984 | Settineri et al. | 526/62 |
| 4,539,380 | 9/1985 | Cheng et al. | 526/78 |

FOREIGN PATENT DOCUMENTS 0000430  1/1979  European Pat. Off. .

*Primary Examiner*—Mark Nagumo
*Attorney, Agent, or Firm*—Thomas J. Howell

[57] ABSTRACT

A process for reducing the formation of aqueous phase polymer during the suspension polymerization of unsaturated monomer is disclosed. The reduction of polymer formation in the aqueous phase and subsequent fouling of polymerization reactor surfaces is achieved by incorporating an effective amount of a water-soluble peroxide compound into the aqueous phase used for the suspension polymerization. Hydrogen peroxide, sodium perborate and sodium percarbonate are effective aqueous phase inhibitors for use in the preparation of crosslinked polystyrene beads.

4 Claims, No Drawings

METHOD FOR REDUCTION OF AQUEOUS PHASE POLYMER FORMATION IN SUSPENSION POLYMERIZATION

The present invention relates to a process for reducing the formation of aqueous phase polymer during suspension polymerizations. In particular the present invention relates to the use of water-soluble compounds that are useful as aqueous phase polymerization inhibitors which reduce polymer buildup in the aqueous phase and subsequent fouling of polymerization reactor surfaces during the suspension polymerization of unsaturated monomers.

BACKGROUND OF THE INVENTION

It has been recognized that during the aqueous suspension polymerization of unsaturated monomers unwanted aqueous phase polymerization can occur resulting in polymer fouling of the polymerization reactors. Besides deposition of polymer on the internal surfaces of the reactors, the development of turbid or cloudy aqueous phase solutions from aqueous polymer formation can render the aqueous phase unsuitable for reuse or recycle.

Aqueous phase polymerization is especially troublesome when the suspension polymerization is conducted under an inert atmosphere, i.e., little or no oxygen is allowed in the reaction environment. The magnitude of aqueous phase polymerization will usually vary depending upon the solubility of the monomer or organic phase in the aqueous phase. Even monomers considered to be relatively water insoluble, e.g., styrene, have some finite water solubility, albeit small, which can lead to aqueous phase polymerization. During the polymerization the aqueous phase solubilized monomer encounters free radicals present in the aqueous phase resulting in aqueous phase polymer formation; this can be a significant problem in both suspension and emulsion polymerization processes.

A variety of aqueous phase inhibitors have been employed to address the problem of unwanted aqueous phase polymerization, but use of these inhibitors has not been entirely successful due to deficiencies associated with each system. For example, aqueous phase inhibitors that have some monomer phase solubility or partition into the monomer phase during the polymerization can retard the desired monomer polymerization rate resulting in inferior polymer properties. Other types of aqueous phase inhibitors require the presence of oxygen to be fully active as inhibitors and, since oxygen is generally removed to allow the desired polymerization to proceed smoothly, these inhibitors have found limited use. Some inhibitors, in order to be functional in the aqueous phase, require adjustment of the acidity or alkalinity in order to solubilize the inhibitor into the aqueous phase; the pH conditions necessary for solubilizing these inhibitors are not always compatible with other requirements of the desired monomer polymerization.

Other approaches to solving the polymer fouling problem during suspension polymerizations include treating the internal reactor surfaces to render the surfaces less susceptible to becoming fouled by polymer buildup. For example, U.S. Pat. No. 4,438,242 discloses a process for treating the internal steel surfaces of polymerization reactors with sulfur trioxide to retard polymer fouling during suspension polymerizations.

The present invention seeks to overcome the deficiencies of prior methods used to reduce aqueous phase polymerization during suspension polymerization by providing a process that does not detrimentally affect the desired monomer polymerization rate, does not require the presence of oxygen and does not require the special pretreatment of reactor vessels.

SUMMARY OF THE INVENTION

According to a first aspect of the present invention there is provided a process for reducing the formation of aqueous phase polymer during suspension polymerization of unsaturated monomer that comprises (a) preparation of an aqueous phase containing an amount of a water-soluble peroxide compound that is effective to reduce the formation of aqueous phase polymer or buildup of polymer on reactor surfaces and (b) suspension polymerization of unsaturated monomer in the presence of the aqueous phase containing the water-soluble peroxide compound.

According to a second aspect of the present invention there is provided a process that comprises suspension polymerization of a styrene/divinylbenzene mixture wherein the water-soluble peroxide compound is selected from hydrogen peroxide, sodium perborate and sodium percarbonate.

DETAILED DESCRIPTION OF THE INVENTION

The process of the present invention is applicable to the suspension polymerization of any unsaturated monomer that can be polymerized using an aqueous medium as the continuous phase. In the most common form of suspension polymerization a monomer or mixture of monomers containing free-radical initiator is dispersed and suspended in an aqueous phase containing dispersants and suspension stabilizers to form droplets of the monomer phase and the temperature is controlled to promote polymerization by decomposition of the free-radical initiator. These methods are well known to those skilled in the art of suspension polymerizations.

Among the unsaturated monomers that may be polymerized using the process of the present invention are vinylaromatic monomers such as styrene, α-methylstyrene, vinyltoluene, ethylvinylbenzene and vinylnaphthalene. Non-aromatic vinyl monomers, such as vinyl acetate, hydrolyzed vinyl acetate, vinyl chloride, acrylonitrile, (meth)acrylic acids and alkyl esters or amides of (meth)acrylic acids (such as methyl acrylate, methyl methacrylate, ethyl acrylate, butyl methacrylate, methyl methacrylamide and dimethylaminopropyl methacrylamide), may also be polymerized using the process of the present invention. Copolymers, such as those prepared from mixtures any of the aforementioned monomers, may also be prepared by the process of the present invention.

Polymers prepared by the process of the present invention may be in the form of either uncrosslinked or crosslinked polymer. Among the crosslinkers that may be copolymerized with unsaturated monomers using the process of the present invention are aromatic polyvinyl compounds such as divinylbenzene, trivinylbenzene, divinyltoluene, divinylpyridine, divinylnaphthalene and divinylxylene; and aliphatic crosslinking monomers such as ethyleneglycol diacrylate, ethyleneglycol dimethacrylate, trimethylolpropane triacrylate, trimethylolpropane trimethacrylate, diethyleneglycol divinyl ether and trivinylcyclohexane. When crosslinked vinylaromatic polymers are desired, e.g., crosslinked polystyrene, the preferred crosslinker is divinylbenzene.

Polymerization free-radical initiators useful in the present invention include monomer-soluble initiators such as organic peroxides, hydroperoxides and related initiators, as for example benzoyl peroxide, cumene peroxide, tetralin peroxide, acetyl peroxide, lauroyl peroxide, caproyl peroxide, tert-butyl peroctoate (also known as tert-butylperoxy-2-ethylhexanoate), tert-butyl perbenzoate, tert-butyl diperphthalate, bis(4-tert-butylcyclohexyl)peroxydicarbonate and tert-butyl peroxypivalate. Also useful are azo initiators such as azodiisobutyronitrile, azodiisobutyramide, 2,2'-azobis(2,4-dimethylvaleronitrile), azo-bis($\alpha$-methylbutyronitrile) and dimethyl-, diethyl- or dibutyl azobis(methylvalerate).

Aqueous phase dispersants and suspension stabilizers that are useful in the process of the present invention include starch, gelatin, celluloses, carboxymethylcellulose, polyacrylic acids, polyvinyl alcohol, polyvinyl pyrrolidones, finely divided particles (such as silica, clays, ground ion exchange resins) and inorganic salts such as calcium hydroxyphosphate, particularly in combination with hydroxyapatite. The inorganic salts may or may not be fully soluble in water, and where they are not fully soluble they may behave similarly to the finely divided particles. Mixtures of dispersants may also be used. Soluble inorganic salts, such as sodium chloride and sodium sulfate, may also be used in addition to the dispersants named above to the reduce the solubility of unsaturated monomers in the aqueous phase.

Water-soluble peroxide compounds useful in practicing the process of the present invention include hydrogen peroxide, perborates and percarbonates. Hydrogen peroxide may be provided in the form of dilute aqueous solutions, typically having a hydrogen peroxide content of 3 to 30 percent by weight of aqueous solution. Perborate is typically provided in the form of solid sodium perborate in hydrate form. Percarbonate may be provided as solid sodium percarbonate in hydrate form, which is an adduct of sodium carbonate and hydrogen peroxide. Other water-soluble forms of peroxide compounds, for example sodium peroxide, percarbamide, perphosphates, perborates and percarbonates may also be used. Solid form sodium perborate and sodium percarbonate are preferred forms of the peroxide compounds of the present invention due to the greater safety, ease of handling and storage stability associated with these materials.

The water-soluble peroxide compound is preferably present at levels from 5 to about 2000 parts per million by weight (ppm) on the total aqueous phase used in the suspension polymerization, and more preferably from 10 to 500 ppm on aqueous phase. In the polymerization of styrene/divinylbenzene the preferred level of hydrogen peroxide in the aqueous phase is about 50 to about 100 ppm; when sodium perborate or sodium percarbonate is used the preferred level is about 10 to about 50 ppm.

While not wishing to be bound by theory, I believe that, in the case of the present invention, the efficacy of water-soluble peroxide compounds as aqueous phase polymer inhibitors is due to the generation of oxygen ($O_2$) or hydroxyl radicals (HO•) as free radical scavengers in the aqueous phase from the decomposition of hydrogen peroxide (as provided by the precursor perborate or percarbonate compounds). The organic radicals (aqueous phase polymer precursor radicals) which are produced in the aqueous phase from contact between solubilized monomer and aqueous phase initiator radicals are trapped as inactive species before they can propagate to form aqueous phase polymer. The aqueous phase polymer precursor radicals are believed to be converted to unreactive organoperoxy radicals by reaction with oxygen or to neutral organohydroxy compounds by radical termination with hydroxyl radicals. Since the $O_2$ and HO• radical scavengers are formed in the aqueous phase and have little solubility in the monomer phase, they operate to suppress aqueous phase polymer formation without significantly interfering with the desired monomer polymerization that is proceeding in the organic phase.

The following examples are intended to further illustrate the invention and do not limit its scope. All ratios and percentages given herein are by weight unless otherwise specified, and all reagents used in the examples are of good commercial quality unless otherwise specified.

EXAMPLE 1 (CONTROL)

This example illustrates the preparation of crosslinked polystyrene by suspension polymerization under an inert nitrogen atmosphere in the absence of an aqueous phase polymerization inhibitor.

A concentrated aqueous phase solution was prepared containing 2 percent sodium hydroxide, 7.8 percent boric acid, 7.1 percent polyacrylic acid polymer (weight average molecular weight ($M_w$) approximately 200,000), 0.8 percent gelatin and 80.2 percent water.

A monomer mixture was prepared containing 216 grams styrene, 34.1 grams divinylbenzene mixture (55 percent divinylbenzene/45 percent ethylvinylbenzene), 0.77 grams tert-butyl peroctoate and 0.8 grams bis(tert-butylcyclohexyl)peroxydicarbonate.

A portion of the concentrated aqueous phase solution (125 grams) was added to a 3-liter flask equipped with a mechanical stirrer, thermocouple and nitrogen inlet. Water (2100 grams) was then added to the flask and the diluted solution (hereafter designated as the prereaction aqueous phase) was heated to 63° C. while stirring at 195 revolutions per minute (rpm) and maintaining the flask under a nitrogen sweep. The monomer mixture was then added to the flask and the contents were heated to 68° C. and maintained at that temperature for 5 hours. The reaction temperature was then raised to 90° C. and maintained there for an additional 1 hour. At this point the aqueous phase was separated from the crosslinked polystyrene copolymer beads by filtration. A large amount of solid polymer was observed adhering to the stirring shaft, thermocouple and flask wall.

The separated aqueous phase (hereafter designated as the postreaction aqueous phase) was then examined for physical appearance. The postreaction aqueous phase was found to be milky white, cloudy and opaque to light. A scale was established for describing the clarity of the postreaction aqueous phase with a rating of 1 corresponding to "substantially clear" (as represented by the prereaction aqueous phase) and a rating of 10 corresponding to "white, cloudy and opaque." Another scale was established for describing the degree of reactor fouling by solid polymer deposition with a rating of 1 corresponding to "no observable fouling of reactor surfaces" and a rating of 10 corresponding to a "large amount of reactor fouling." The results observed for Example 1 were used as the standard for a rating of 10 on the relative scales describing clarity of aqueous phase and degree of reactor fouling.

EXAMPLES 2–8

The procedure of Example 1 was repeated as described above and additional aqueous phase inhibitors at different use levels (expressed as parts per million by weight per weight of total aqueous phase) were evaluated for their effectiveness in reducing the formation of aqueous phase polymer during the suspension polymerization of styrene/divinylbenzene. Table 1 presents a summary of the results using the rating scales for aqueous phase clarity and reactor fouling as described in Example 1 (control). Examples 2 and 3 represent the use of known aqueous phase polymerization inhibitors that have some effect on aqueous polymer formation, but not to the degree offered by the process of the present invention (Examples 4, 5, 6 and 7). For example, sodium nitrite (Example 2) slightly increased the clarity of the postreaction aqueous phase when compared to the control but did not significantly affect the degree of reactor fouling. Methylene Blue (Example 3) offered improved postreaction aqueous phase clarity and reactor fouling compared to sodium nitrite, but the resultant copolymer beads were discolored (light pink or blue tint). The aqueous phase inhibitor used in Example 6 was hydrogen peroxide (74 ppm) provided by adding 245 ppm of a 30% hydrogen peroxide solution to the prereaction aqueous phase. Example 8 was conducted as in Example 1 except that it was conducted in the presence of air, i.e., without nitrogen inertion; the rate of styrene/divinylbenzene polymerization was slower than that of Examples 1–7.

We claim:
1. A process for reducing the formation of aqueous phase polymer or buildup of polymer on reactor surfaces during suspension polymerization of unsaturated monomer that comprises:
   (a) preparation of an aqueous phase containing an amount of a water-soluble peroxide compound that is effective to reduce the formation of aqueous phase polymer or buildup of polymer on reactor surfaces, wherein the water-soluble peroxide compound is selected from perborate or percarbonate compounds; and
   (b) suspension polymerization of unsaturated monomer in the presence of the aqueous phase containing the water-soluble peroxide compound.

2. The process of claim 1 wherein the water-soluble peroxide compound is selected from sodium perborate or sodium percarbonate.

3. The process of claim 1 wherein the amount of water-soluble peroxide compound is from 5 to 2000 parts per million by weight on the aqueous phase.

4. A process for reducing the formation of aqueous phase polymer or buildup of polymer on reactor surfaces during suspension polymerization that comprises:
   (a) preparation of an aqueous phase containing 10 to 100 parts per million by weight on aqueous phase of a water-soluble peroxide compound selected from sodium perborate or sodium percarbonate; and
   (b) suspension polymerization of a mixture of styrene and divinylbenzene in the presence of the aqueous phase containing the water-soluble peroxide compound.

* * * * *

TABLE 1

|  | Aqueous Phase Inhibitor | Amount of Inhibitor (ppm) | Aqueous Phase Clarity Rating | Degree of Reactor Fouling Rating |
|---|---|---|---|---|
| Example 1 | None (control) | 0 | 10 | 10 |
| Comparative Example 2 | Sodium Nitrite | 3000 | 7 | 9 |
| Comparative Example 3 | Methylene Blue | 30 | 5 | 7 |
| Example 4 | Sodium Perborate | 30 | 3 | 4 |
| Example 5 | Sodium Perborate | 50 | 2 | 2 |
| Example 6 | Sodium Percarbonate | 30 | 3 | 2 |
| Example 7 | Hydrogen Peroxide | 74 | 2 | 2 |
| Comparative Example 8 | Air (oxygen) | — | 2 | 2 |